F. W. HARRIS.
PROCESS AND APPARATUS FOR DEHYDRATING EMULSIONS.
APPLICATION FILED APR. 4, 1917.
1,281,952.
Patented Oct. 15, 1918.
2 SHEETS—SHEET 1.
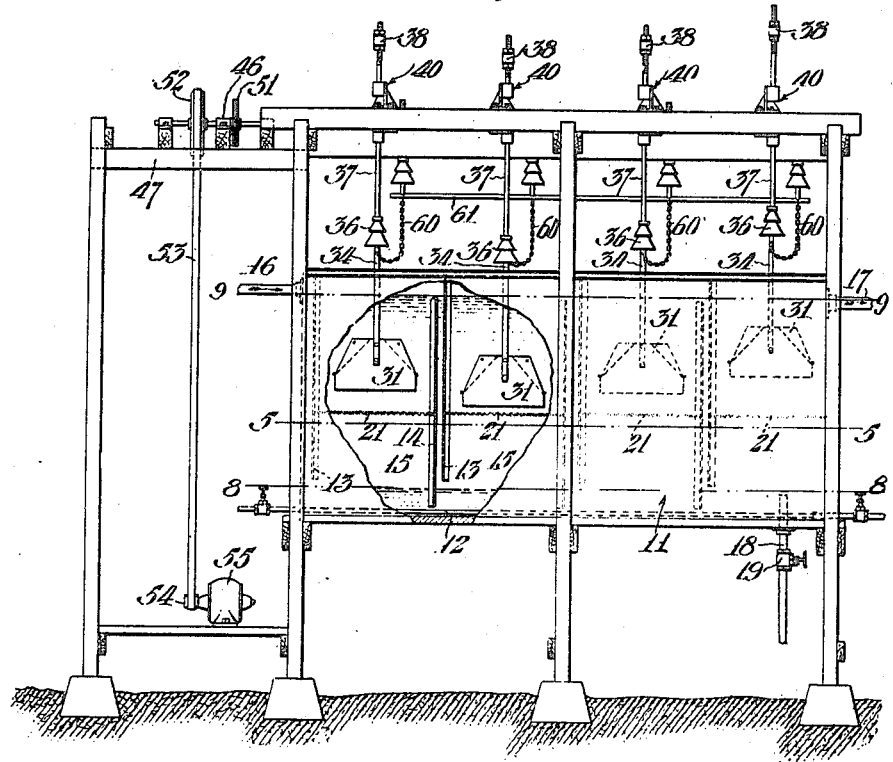
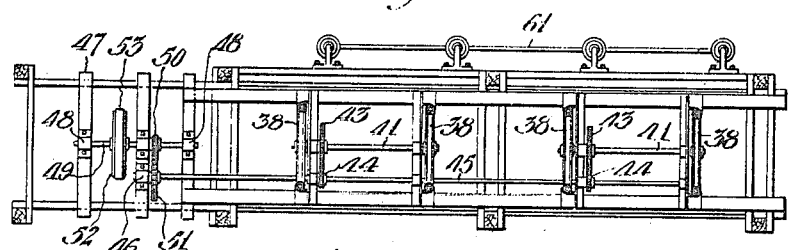
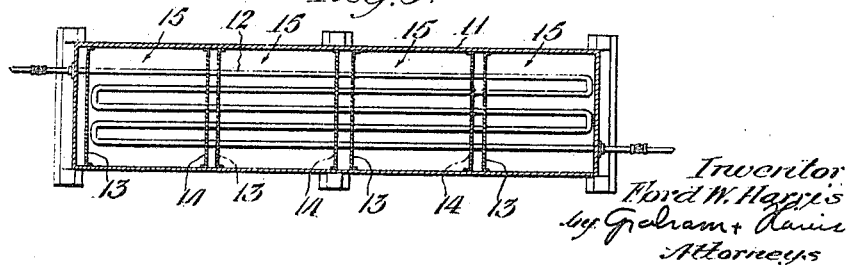

F. W. HARRIS.
PROCESS AND APPARATUS FOR DEHYDRATING EMULSIONS.
APPLICATION FILED APR. 4, 1917.
1,281,952.
Patented Oct. 15, 1918.
2 SHEETS—SHEET 2.
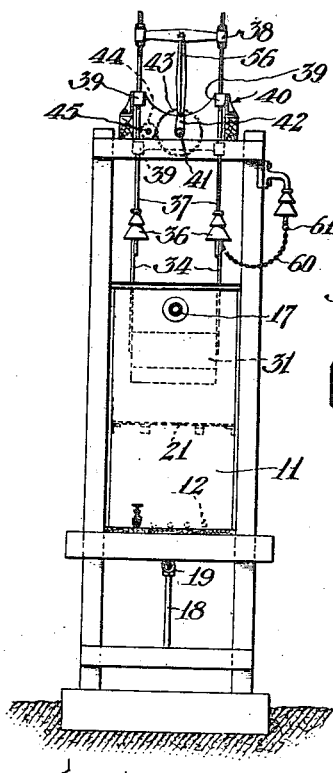
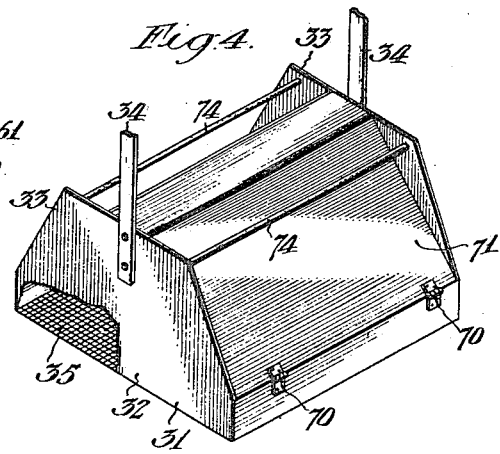
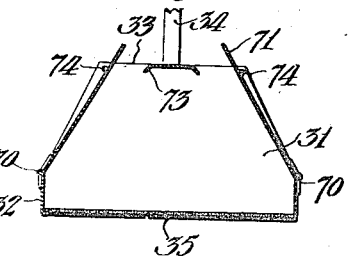
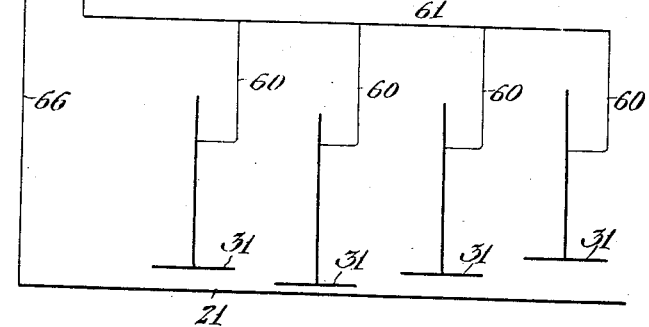
Inventor
Ford W. Harris
by Graham & Harris
Attorneys

UNITED STATES PATENT OFFICE.

FORD W. HARRIS, OF LOS ANGELES, CALIFORNIA.

PROCESS AND APPARATUS FOR DEHYDRATING EMULSIONS.

1,281,952.      Specification of Letters Patent.    Patented Oct. 15, 1918.

Application filed April 4, 1917. Serial No. 159,768.

*To all whom it may concern:*

Be it known that I, FORD W. HARRIS, a citizen of the United States, residing at Los Angeles, in the county of Los Angeles and State of California, have invented a new and useful Process and Apparatus for Dehydrating Emulsions, of which the following is a specification.

My invention relates to the art of removing water from emulsions of oil and water, or, as it is commonly called, to the art of dehydrating emulsions. Petroleum oil as found in nature often contains considerable water which must ordinarily be taken out before the oil is used and preferably must be taken out before the oil is transported to any great distance from the point of production. This water is ordinarily carried in the oil as an emulsion formed of isolated masses of water surrounded by oil, and these masses of water may be of any size from clearly visible globules to microscopically small particles. As water is somewhat heavier than the oil, gravity acts to draw the water through the oil and emulsion, this settling being resisted by the viscosity of the oil and being expedited by heating the emulsion, which has the effect of lightening the oil and reducing its viscosity. It is, therefore, common practice to "roast" emulsions, maintaining them at considerable temperatures for some time to allow the water to settle. It is found, however, that the finer particles of water take an unduly long time to settle out and this has led oil well operators to speak of the water carried in these fine globules as trapped water, the water which readily settles being spoken of as free water. While there is only a difference of degree involved, this distinction will be observed in the following specification, the free water being that which will settle out at economical temperatures and in an economical time, and the trapped water being that which will not settle out at economical temperatures in an economical time.

The principal object of my invention is to provide a process and apparatus for agglomerating the trapped water to form free water. This I accomplish by the use of electric discharges through a body of the emulsion. The fact that such discharges will accomplish this object is well known, and various schemes have been proposed for so utilizing them. This is not difficult, as any voltage of sufficient magnitude to puncture a mass of the emulsion will in some degree cause such an agglomeration. The difficulty lies in devising an apparatus that can be used by any ordinary oil well operator, which will have a large capacity and low cost, and in which the amount of electrical energy used will be small as compared to the oil treated.

When an electrical potential of sufficient magnitude is impressed on electrodes immersed in a body of emulsion, there is apparently an electrostatic action tending to line the particles up in chains between the electrodes, the separate drops or globules of each chain tending to unite, due apparently to their propinquity and the force with which they are pulled into line. Agglomeration can apparently be accomplished without the passage of any considerable current between the electrodes or the breaking down of the natural high resistance path offered by the emulsion, and dehydration by this method is very economical of electrical energy. If this lining up in chains is allowed to continue there is eventually a heavy discharge of electric current or a short circuit current flows between the electrodes through a low resistance path formed almost entirely of water. This short circuit current is naturally very stable and persistent and quite wasteful of electrical energy. It has been the endeavor of certain previous inventors to devise apparatus and processes in which these chains were broken up before they were entirely formed, thus preventing the formation of chains completely short circuiting the electrodes and preventing the flow of the heavy and wasteful short circuit current. These inventions have not been an unqualified success, due to the fact that such apparatus must of necessity work within a very narrow range. If the potential is too low very little dehydration takes place, and if too high, short circuit currents flow which use up large amounts of energy with no economical result. Such previous inventions are therefore somewhat unsuited to oil well work as they require skilled labor for their operation.

They have, however, a more serious defect in that while the dehydrating action is very economical of electric energy, the capacity in treated oil for any size of plant is small as compared to a plant operating in accordance with my invention.

I have found that emulsions can be quite economically and easily dehydrated by wilfully forming low resistance paths of water between electrodes immersed in the emulsion if the short circuit currents are not maintained for too long a period, and my invention is directed to the formation and breaking of such low resistance paths in a mass of emulsion. I form such paths by bringing my electrodes so close together that a heavy current immediately flows, this current persisting for an appreciable time before the path is broken. By this means it is possible to produce an apparatus which can be operated by any one without very much attention, and the capacity in oil treated is very high. I am inclined to believe that there is an electromagnetic action after the short circuit is formed that materially helps in increasing the capacity. This action is due to the natural attraction exerted between parallel paths carrying currents of the same polarity. I believe that when my electrodes approach each other that a considerable number of chains are formed, these chains being more or less parallel and exerting a strong attraction on each other. By maintaining a heavy current in these chains for a short time after they are formed they are pulled together and form large masses of free water which will readily settle out of the emulsion. While the large masses of water so agglomerated will settle out of the emulsion very rapidly, especially if the viscosity of the oil is low, there is still an appreciable time required for such settling, and if the current is again applied to the same mass of material without allowing for this settling, a waste of current will occur due to the flow of current through the agglomerated free water. In my invention I provide a lower electrode so arranged that the water can quickly get away from the path of the current and at the same time I lift the mass of cleaned oil out of the path of the current before again causing the current to flow between the electrodes. As a result the material between the electrodes is largely changed between current flows, so that the current has constantly new masses to act upon. This lifting of the cleaned oil I accomplish by the use of suitably designed and actuated upper electrodes and I utilize the movement of these electrodes also to increase the length of the current path and eventually break the circuit. In an apparatus of this character the cost of the high potential transformer, when alternating current is used, is an important item and it would prove rather expensive to install a transformer that would operate for only a short interval and then stand idle during the time the upper electrode is moving to change the material to be treated. For the purpose of reducing the cost of the transformer and increasing the capacity of the plant, I operate a number of treaters from one transformer, the upper electrodes of the different treaters being so set and actuated with relation to each other that one treater has a heavy current flowing while the others are free from such currents, each treater operating in turn.

I have found that when an emulsion containing a large amount of water is subjected to the action of an electric current that large amounts of water are agglomerated and that the amount of dehydration that takes place with a given current flow varies somewhat in proportion though not necessarily in direct proportion to the amount of water in the emulsion. It is therefore economical to run the treaters in series, the amount of water in the oil diminishing in the successive treaters until the last treater brings it down to a commercial value, which is ordinarily less than three per cent. of the total.

It will therefore be seen that my invention is designed to dehydrate emulsions by the use of electric current; that is, it is designed to provide an apparatus and process that may be operated by unskilled labor and that it is designed to provide an apparatus that will have a large output per dollar of first cost. It will further appear that this is accomplished first by forming chains of water through which heavy short circuit currents pass, by breaking such chains as soon as a good agglomeration takes place, and by removing the water and treated oil from between the electrodes before forming more chains. It will further appear that these results follow from the use of a moving upper electrode which serves to break the currents so set up and at the same time to move the material treated, so that the next flow of current has an entirely new mass of material to work on. It will further appear that additional economies are effected by the use of a series of treaters working successively on the material and all connected to a single set of electrical apparatus.

Further objects and advantages will appear hereinafter or will be evident to one skilled in the art by an inspection of the drawing taken in connection with the following specification and claims.

In the drawings, which are for illustrative purposes only:

Figure 1 is a side elevation of a plant embodying my invention, a portion thereof being broken away and shown in section.

Fig. 2 is an end elevation of the same plant.

Fig. 3 is a plan view, the lower portion of the apparatus being omitted for the sake of clearness.

Fig. 4 is a perspective view of an upper electrode, a portion thereof being broken away to better illustrate the invention.

Fig. 5 is a section on a plane represented by the line 5—5 in Fig. 1.

Fig. 6 is a vertical section through an upper electrode.

Fig. 7 is a diagram of connections.

In these drawings, a four compartment dehydrator is shown, it being understood that a greater or lesser number of compartments can be used if desired.

In the form of dehydrator shown in these drawings, a tank 11 is shown having a steam coil 12 located in the bottom thereof and having a series of partitions 13 and 14 extending completely across it dividing it into four compartments 15. The partitions 13 extend from the top of the tank to a point just above a line 8—8 which is near the bottom of the tank 11 and which may be designated as the water line, and the partitions 14 extend from a point just above the top of the steam coil 12, which is considerably below the line 8—8, to a point just below a line 9—9 which may be designated as the oil line, this line defining the normal level of the oil or emulsion in the tank. An inlet pipe 16 delivers emulsion to one end of the tank, and an outlet pipe 17 carries away the cleaned oil. A water outlet pipe 18, provided with a valve 19, projects up into the tank to a point just below the line 8—8.

Secured to the sides of the tank 11 and the partitions 14 and 13 are the lower electrodes 21. These electrodes are preferably made of wire screen and are electrically connected to the tank 11. Suspended centrally in each of the compartments 15, above the lower or stationary electrodes 21, is an upper or movable electrode 31. These upper electrodes are composed of a square frame 32 having upwardly projecting sides 33 to which are attached suspension rods 34. The bottom of the frame 32 is covered with a wire screen member 35 which forms a parallel surface to the screen member of the lower electrode 21. It is between the two screen members 35 and 21 that all the electrical currents flow for the purpose of dehydration.

Each of the suspension rods 34 has secured at the upper end thereof an insulator 36, these insulators having secured at their upper ends a guide rod 37.

The guide rods 37 are connected by a crosshead 38 and slide in bearings 39 formed in a cross head casting 40. The cross head casting 40 may be considered as being arranged in two pairs, each pair being connected by a crank shaft 41 which turns in central bearings formed in the cross head casting 40. Secured to each end of each of the crank shafts 41 is a crank 42, the cranks on each end of any one shaft being set 180 degrees apart, and the two shafts being in such relation to each other that the cranks on one shaft 41 are 90 degrees apart from the cranks on the other shaft 41. Each of the shafts 41 is provided with a gear 43 which is driven by a pinion 44, the pinion 44 being fixed to a drive shaft 45 which is journaled in suitable bearings formed in the cross head casting 40 and in a bearing 46 which with the tank 11 and the various other mechanism is supported on a suitable wood frame 47, as shown in the drawings. Also supported on this frame are bearings 48 which carry a shaft 49 which drives the shaft 45 through a pinion 50 and a gear 51. The shaft 49 is driven through a pulley 52 and a belt 53 from the pulley 54 of a motor 55, or from any other suitable source of power. Each of the cranks 41 is connected to its respective cross head 38 by a connection rod 56.

Each of the upper electrodes is connected through chains or wires 60 with a suitably insulated bus bar 61 which is connected to one side of the secondary 63 of a suitable transformer generating sufficient voltage to establish a short circuit between the electrodes 21 and 31 when the electrodes 31 are in their lower position. The opposite side of the secondary 63 is connected through a wire 66 with the tank 11 and through this tank with the lower electrodes 21. The primary 64 of the transformer is connected through suitable fuses and switches with a constant potential distribution system. A resistance 65 may in some cases be connected directly into the circuit of the primary 64 for the purpose of limiting the maximum value of the short circuit.

Secured on hinges 70 between the sides 33 of the upper electrodes 31 is a pair of doors 71, these doors resting at their upper ends on a cross bar 73. A pair of rods 74 are connected between the sides 33 so that they allow the door to swing upward and partly open, but strictly limit such opening.

The method of operation of my invention is as follows:

The tank 11 being filled with the emulsion which it is desired to dehydrate, and a steady flow of emulsion being supplied to the tank 11 through the pipe 16, the upper electrodes 31 are put in motion by starting the motor 55, this motor driving the shaft 49 through the pulleys 54 and 52 of the belt 53. The shaft 49 drives the shaft 45 through the pinion 50 and the gear 51, and the shaft 45 actuates the shafts 41 through the pinions 44 and gears 43. As previously explained, the cranks 42 on each of the shafts 41 are set 180 degrees apart, the cranks on one of these shafts being set 90 degrees apart from the cranks on the other shaft. As a result, the four cranks are set 90 degrees apart around the circumference of a circle. As the shafts 41 are rotated, the motion of each crank 42 is transmitted through one of the connection rods 56 to one of the cross heads 38, this motion being transmitted to the proper guide rods 37 which slide in the bearings of the cross head castings 40. An up and down harmonic motion is therefore transmitted to each of the upper electrodes 31, these electrodes alternately approaching and receding from the lower electrodes 21. As each of the upper electrodes 31 is connected to one side of the secondary 63 of the high tension transformer through the wires 60, 61 and 62, and as the lower electrodes 21 are all connected through the wire 66 to the other side of the secondary 63, an alternating electrical potential is impressed between each pair of the upper electrodes 31 and lower electrodes 21, and as these electrodes approach very near together at the bottom of their stroke, a heavy electrical discharge takes place therebetween, this discharge being formed through water chains which are formed and agglomerated into large masses. These large masses immediately fall through the meshes of the lower electrodes 21 and settle in the bottom of the tank, becoming incorporated with the body of water which always lies in the tank below the line 8—8. Water may be continuously taken off from this body of water by means of the water outlet pipe 18 by a suitable manipulation of the valve 19, or it may be automatically drained off by any one of several means well known in the art.

As soon as a low resistance path consisting of water chains has been formed between the upper electrode 31 and the lower electrode 21 in any compartment 15, the chains are elongated by the subsequent upward movement of the electrodes 31, this upward movement being quite considerable as compared to the initial gap. This lengthening out of the current path greatly increases the resistance of the path, so that as the upper electrode 31 in an adjacent compartment reaches its lower position, the current reestablishes new low resistance paths and chains in that compartment, and the current ceases in the compartment in which the upper electrode has made its upward motion. As a result, the chains are formed in each of the compartments successively, these chains being drawn out and agglomerated by the movement of the electrode and the current continuing to flow until the upper electrode in another compartment has approached sufficiently to allow the current to form a much lower resistance path. As a result, each of the compartments momentarily receives practically the full power delivered by the secondary 63, the remaining compartments being comparatively inert during this time. The upper electrodes 31 not only serve to draw out the arc, but due to the operation of the doors 71 they act as pistons to draw fresh charges of emulsion between the electrodes during the up-stroke of the upper electrode 31. During this up-stroke the doors 71 are closed, resting against the cross bar 73, and fresh emulsion is drawn into the space between the electrodes from the sides and ends of the tank and to some extent upwardly through the lower electrode 21. As soon as any one of the upper electrodes 31 starts on its downward path, the doors 71 open until they strike the rods 74, and the previously treated oil which has collected inside the upper electrode is released into the top of the tank. In other words, the upper electrodes 31 pick up a considerable quantity of the already treated material on the up-stroke and release it through the doors into the top of the tank on the down-stroke, so that when the upper electrodes reach a point at or near the bottom of their travel, and new chains are formed, these chains are formed through fresh emulsions and not through the same mass of material which was treated upon the previous flow of current.

The emulsion in entering the tank through the oil inlet pipe 16 is forced to flow downwardly to a point just above the top of the water in the bottom of the tank by the first of the partitions 13. This emulsion then passes upwardly through the lower electrode screen members 21 of the first compartment and is subjected to the dehydrating action of the current, finally passing over the partitions 14 and flowing downwardly between the partitions 13 and 14 to a point in the next compartment 15 just above the water line 8—8, and repeating this movement through the successive compartments. By introducing the emulsion into the bottom of the compartments 15, so that the general direction of flow through the compartment is upward, we allow the masses of free water to settle out in each individual compartment and join the water in the bottom of the tank 11. At the same time, the liquid in the top of each of the compartments is very considerably drier than the material in the bottom, and by making the partitions 14 in the shape shown we are able to skim off from the top of each of the compartments 15 the clean oil, mixed with a certain proportion of emulsion, with perhaps small quantities of free water. The amount of water present in the liquid continually diminishes as the oil flows successively through the various compartments 15, so that the oil which is finally taken off from the top of the last compartment, by the pipe 17, contains very small quantities of water in any form, the dehydration being practically complete.

The water in the bottom of the tank acts as a seal for the bottom of the various partitions 14, preventing emulsion or oil from passing around the bottom thereof. By stopping the partitions 14 somewhat above the bottom of the tank 11 and allowing an open space thereunder, I am able to use a single heating coil and a single water outlet pipe 18. By immersing the heating coil 12 in this body of water, there is no danger of burning the oil due to its contact with hot steam pipes, and it is possible to maintain the temperature of the contents of the tank 11 at any desired degree. In some cases, it is desirable to heat the emulsion before delivering it to the tank 11, and in some cases it is desirable to deliver the oil from the pipe 17 into an auxiliary settling tank in which the liquid is maintained at considerable temperatures for the purpose of allowing a further settling of the free water. In other words, in some cases it is economical to run the apparatus shown in the drawings at such a rate that considerable free water is carried off through the pipe 17. In most cases, however, it is possible to settle out sufficient water from the compartments 15 to bring the effluent passing through the pipe 17 down to the desired degree of dryness.

As we wilfully form heavy short circuits in the various compartments 15, variations in the quality of the emulsion supplied do not in any way affect the electrical operation of the plant. In other words, if we are supplying a liquid which consists wholly of emulsion, and this emulsion is cut down by changes in production to 25 per cent. of its original value, it does not affect the operation of the apparatus, short circuits still being formed and the dehydration still continuing. In this particular, my invention differs very materially from those in which the apparatus must be regulated in such a manner as to prevent the formation of chains, as in such cases this regulation must be constantly made to suit any varying conditions of the liquid supplied. By causing these heavy short circuits, and by pulling them out mechanically in the treater, a comparatively small apparatus has a large capacity, so that the first cost of a treater for handling large amounts of emulsion is quite low. At the same time, by running the treater at a suitable speed, and by my arrangement which provides for successive action in the different compartments, the current economy is still quite low.

I claim as my invention:—

1. A process of dehydrating emulsions which consists in impressing an electrical potential on electrodes immersed in the emulsion; causing the electrodes to approach each other to a sufficient degree to cause water chains to be formed between the electrodes through which heavy short circuit currents can flow; and thereafter breaking said chains and interrupting said currents by separating said electrodes.

2. A process in which a plurality of sets of electrodes operating as set forth in claim (1) are used, said electrodes being so arranged that only one set of electrodes is in current carrying relationship at any given time.

3. A process in which electrodes operating as set forth in claim (1) are so arranged that the separation and approach of the electrodes constantly changes the material to be acted on.

4. An apparatus for dehydrating emulsions comprising a containing vessel; a lower electrode fixed in said containing vessel; an upper electrode suspended over said lower electrode and movable vertically with relation thereto; means for impressing an electromotive force between said electrodes; and means for moving said upper electrode vertically toward and away from said lower electrode.

5. An apparatus as specified in claim (4) in which the upper electrode is provided with a valve so that the up and down movement of the electrode produces a unidirectional trend to the movement of the oil.

6. An apparatus as specified in claim (4) in which the lower electrode is provided with perforations through which the agglomerated water may escape.

In testimony whereof, I have hereunto set my hand at Los Angeles, California, this 29th day of March, 1917.

FORD W. HARRIS.